(12) United States Patent
Bybee et al.

(10) Patent No.: US 7,730,114 B2
(45) Date of Patent: Jun. 1, 2010

(54) COMPUTER FILE SYSTEM

(75) Inventors: Andrew G. Bybee, Duvall, WA (US);
Anil K. Nori, Redmond, WA (US);
Balan Sethu Raman, Redmond, WA (US); Timothy P. McKee, Seattle, WA (US); Walter R. Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 10/985,907

(22) Filed: Nov. 12, 2004

(65) Prior Publication Data
US 2006/0106841 A1 May 18, 2006

(51) Int. Cl.
*G06F 12/00* (2006.01)
(52) U.S. Cl. ................................. 707/825; 707/829
(58) Field of Classification Search .............. 707/1, 707/100, 101, 200, 205, 2, 829, 825
See application file for complete search history.

(56) References Cited

U.S. PATENT DOCUMENTS

| | | | |
|---|---|---|---|
| 5,247,658 A * | 9/1993 | Barrett et al. .................. 707/1 |
| 5,544,360 A | 8/1996 | Lewak et al. | |
| 5,724,578 A | 3/1998 | Morinaga et al. | |
| 6,615,224 B1 | 9/2003 | Davis | |
| 2002/0107859 A1* | 8/2002 | Tsuyuki ...................... 707/100 |
| 2003/0065659 A1* | 4/2003 | Agarwal et al. ................ 707/4 |
| 2003/0229537 A1* | 12/2003 | Dunning et al. ............... 705/10 |
| 2003/0229612 A1* | 12/2003 | Keller et al. ................... 707/1 |
| 2004/0117410 A1* | 6/2004 | Dietterich et al. ........... 707/200 |
| 2004/0230793 A1* | 11/2004 | Estrada et al. ............... 713/156 |
| 2004/0243938 A1* | 12/2004 | Weise et al. ................. 715/526 |
| 2004/0249822 A1* | 12/2004 | Keohane et al. ............. 707/100 |
| 2005/0120292 A1* | 6/2005 | Suzuki .................... 715/501.1 |
| 2005/0149503 A1* | 7/2005 | Raghavachari ................ 707/3 |

(Continued)

FOREIGN PATENT DOCUMENTS

WO   WO2004008348   1/2004

OTHER PUBLICATIONS

15. Symbolic and Hard Links, printed from http://www.gnoppix.org/pages/rute/node18.html on Jan. 5, 2005, 2 pages.

(Continued)

*Primary Examiner*—Hosain T Alam
*Assistant Examiner*—Amy Ng
(74) *Attorney, Agent, or Firm*—Shook, Hardy & Bacon L.L.P.

(57) ABSTRACT

A file system that does not conflate item lifetime with the item's inclusion in an organizational structure of the file system is described herein. In addition, the file system's organizational structure is not limited to directory trees, but instead may use any directed acyclic graph (DAG). Items, once stored into the file system, may be maintained until affirmatively deleted by a client of the file system, regardless of whether the item is part of a DAG or not. Items may be placed in file regions, which are conceptual workspaces for a client to control item lifetime and to organize items into any DAG structure of the user's choosing. Items may be concurrently stored in multiple DAGs, and each file region may have one or more independent DAGs. An item's placement in a DAG may also be used to govern file properties such as namespace, security, privacy, and read/write attributes.

13 Claims, 7 Drawing Sheets

U.S. PATENT DOCUMENTS

2005/0160373 A1*  7/2005  Chakravarty et al. ........ 715/827
2005/0187889 A1*  8/2005  Yasoshima ..................... 707/1
2006/0075071 A1*  4/2006  Gillette ....................... 709/219
2006/0288044 A1* 12/2006  Kashiwagi et al. .......... 707/200

OTHER PUBLICATIONS

NTFS file system, printed from http://www.digit-life.com/articles/ntfs on Jan. 5, 2005, 9 pages.

Ricardo A. Baeza-Yates, et al., "New Approaches to Information Management: Attribute-Centric Data Systems," String Processing and Information Retrieval, 2000, Spire 2000, Proceedings Seventh International Symposium on Sep. 27-29, 2000, Piscataway, NJ, USA, IEEE, Sep. 27, 2000, pp. 17-27.

C. M. Bowman, "A File System for Information Management," Proceedings of the ISMM International Conference, Intelligent Information Management Systems, Proceedings of ISMM Symposium, Jun. 1, 1994, pp. 66-71.

European Search Report (05021459.2 dated Mar. 28, 2006).

* cited by examiner

|     | 303 | 305 |     | 307 | 309 | 311 |
|-----|-----|-----|-----|-----|-----|-----|

301

| File ID | File Name | Volume | Location | Size |
|---------|-----------|--------|----------|------|
| 000001 | To Do List | C | 19836 | 2 |
| 000002 | I2 | C | 19838 | 20 |
| 000003 | I3 | C | 19858 | 14 |
| 000004 | Items For My Trip | C | 02864 | 3 |
| 000005 | I4 | D | 34884 | 32 |
| 000006 | I5 | C | 07893 | 18 |
| 000007 | Key Slide Decks | D | 02389 | 2 |
| 000008 | I8 | D | 00034 | 97 |
| 000009 | I9 | C | 00625 | 23 |
| ... | ... | ... | ... | ... |
| 00085 | I1 | C | 08762 | 13 |
| ... | ... | ... | ... | ... |
| 00135 | I2 | D | 09238 | 27 |
| ... | ... | ... | ... | ... |
| 00245 | L1 | C | 04874 | 4 |
| 00246 | I7 | L | 07629 | 45 |
| ... | ... | ... | ... | ... |
| 00301 | \ | C | 05672 | 1 |
| 00302 | Users | C | 05673 | 1 |
| 00303 | Machine | C | 05674 | 1 |
| 00304 | U1 | C | 05675 | 1 |
| 00305 | U2 | C | 05676 | 1 |
| 00306 | App Data | C | 05677 | 1 |
| 00307 | User Data | C | 05678 | 1 |
| 00308 | App Data | C | 05679 | 1 |
| 00309 | User Data | C | 05680 | 1 |
| 00310 | Private | C | 05681 | 1 |
| 00311 | Private | C | 05682 | 1 |
| 00312 | Shared | C | 05683 | 1 |

Figure 3

|     | 403 | 405 |
|-----|-----|-----|

401

| Parent | Child |
|--------|-------|
| 000001 | 000002 |
| 000001 | 000003 |
| 000004 | 000003 |
| 000004 | 000005 |
| 000004 | 000007 |
| 000004 | 000008 |
| 000007 | 000005 |
| 000007 | 000006 |

Figure 4

| Parent | Child |
|--------|-------|
| 000001 | 000002 |
| 000001 | 000003 |
| 000004 | 000003 |
| 000004 | 000005 |
| 000004 | 000007 |
| 000004 | 000008 |
| 000007 | 000005 |
| 000007 | 000006 |
| 000246 | 000009 |

COMPUTER FILE SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to file systems for computer systems. More specifically, the invention provides a file system that does not conflate the lifetime of items stored in the file system with the underlying organizational structure used by the file system, thus allowing the items stored in the file system to each have zero, one, or more parents in the organizational structure without risk of deletion.

BACKGROUND OF THE INVENTION

Computers store files on storage devices such as disk drives. The disk drive only provides a place to store data, similar to an empty file cabinet. Just as an empty filing cabinet does not come with any predefined filing system for files (i.e., users of the filing cabinet must create the filing system or organizational structure themselves, e.g., by alphabetizing files), a hard drive is also, by default, just an empty storage space. By itself, the only way to access data on a hard drive is by either specifying the data's physical location (e.g., by specifying the cylinder, head, and sector of the hard drive where a file is stored), or by its logical location (e.g., the 21,671st block) on the disk. Once the hard disk drive is installed on a computer, the computer uses a file system to keep track of files stored on the hard disk drive in an easily-accessible manner.

Known file systems unduly limit how the operating system and user of the file system can organize files in the file system. That is, known file systems typically require users to organize items in a tree of files and directories, where directories are in fact a special kind of file identified by the file system. Even if a file system supports additional data structures, this capability is typically not exposed to the file system's clients (i.e., end-users and applications). FIG. 2 illustrates a brief example of a typical organizational structure 201 of present file systems. As illustrated in FIG. 2, known file systems use a tree to organize directories (illustrated with rounded ends) and files (illustrated with squared off ends). In a tree structure, an item's location and organization are conflated; every item must be in one and in exactly one directory. This is how the user must organize his or her files, and the user is unable to place an item in multiple organizations without creating a new copy of the item.

Typical file systems use two tables or databases in conjunction with each other to organize files. The first table or database is a lookup table that identifies the physical location at which a file is stored on a storage device such as a hard drive. The second table defines the organizational structure of the files. These tables are generically referred to herein as the location table (LOC) and organizational table (ORG), respectively. The organizational table stores information regarding holding links, i.e., that one item is the parent of another item. Some file systems may combine the location table and the organizational table into a single table or structure, but still require that elements of both tables be present in order for the file system to operate properly. For example, in the NT brand file system marketed by Microsoft Corporation, or NTFS, a Master File Table acts as both the location table and as the organizational table. Similarly, the Unix file system, UFS, uses a table of i-nodes that acts as both the location table and the organizational table for files. Directories are stored as a special kind of file, where the directory "file" stores a list of filenames within the directory and their respective i-nodes.

In these and other known file systems, the file system keeps a file stored on the physical storage device as long as the file is located in at least one location as defined by holding links in the organizational table, i.e., there is at least one holding link pointing to the file. That is, if a holding link for a file is deleted from the organizational table, and there are no more holding links pointing to that file, then the file system removes the file's entry in the location table (regardless of whether the file is physically overwritten on the storage device). The storage device may then use the storage space to write new data. For example, if a user were to "delete" the file C:\PROGRAMS\MICROSOFT\OFFICE\WORD\FILE.DOC depicted in FIG. 2, the file system first removes the file's entry from the organizational table. If the file has no other entries in the location table, i.e., the file is not also stored somewhere else, then the file system removes the file's entry in the location table, thus freeing the space for other data. Typically, the file system maintains a reference count of the number of ancestors (called "holding links") any given item has. When the last holding link on an item is removed, the item is "deleted" By removing the file's reference in the location table. However, this is undesirable from an end-user perspective, as it limits the organizational structures that a file system can use.

Due to the above restrictions and limitations (e.g., deletion as a by-product of removing a file from the tree), file systems do not allow clients to organize data in data structures other than tree-like hierarchies of directories and files. Users want to be able to organize and de-organize items, in a variety of organizational data structures, without concern that a given item will be deleted. It would be an advancement in the art if the lifetime of an item were separate from its organization in the file system. That is, it would be an advancement to provide a file system that does not conflate item lifetime with organizational structure, where an act of organizing or de-organizing the item does not affect its lifetime. Thus, it would be an advancement in the art to provide a file system that does not limit the types of data structures in which the operating system and/or user can organize files, and also that does not delete a file simply because it is removed from all organizational structures within the file system or has no holding links pointing to the file.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome one or more limitations in the prior art described above, and/or to overcome other limitations that will be apparent upon reading and understanding the present specification, the present invention is generally directed to a file system embodied as data items and computer executable instructions stored on a computer readable medium. Data items generally refer to any data that can be stored in a file system, including but not limited to files, folders, data, music, etc. The file system uses a first data table storing item location information for at least first, second and third data items stored within the file system, and uses a second data table storing organizational information for the first and second data items but not storing organizational information for the third data item.

A file system manager software module of the file system may be embodied as computer executable instructions stored on a computer readable medium. The file system manager manages data items stored in the file system based on item location data and item organizational data. The file system manager uses a first subroutine for deleting items from the file system, and uses a second subroutine for removing items from the file system.

The file system manager performs a method for managing items stored in the file system, including receiving a first request to delete a first item from the file system, and responsive to the first request, deletes references to the first item from location information associated with the file system and from organization information associated with the file system. The file system manager receives a second request to remove a second item from the file system, and responsive to the second request, deletes references to the second item from the organization information associated with the file system, but does not delete references to the second item from the location information associated with the file system.

Another aspect of the invention provides a file system for storing data items, where the file system is embodied as computer executable instructions stored on a computer readable medium. In the file system, data item lifetime is independent of a location of the data item within any conceptual organization of data items in the file system.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3 illustrates a location table (LOC) according to an illustrative embodiment of the invention.

FIG. 4 illustrates an organizational table (ORG) according to an illustrative embodiment of the invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Computing Environment

Figure 1:
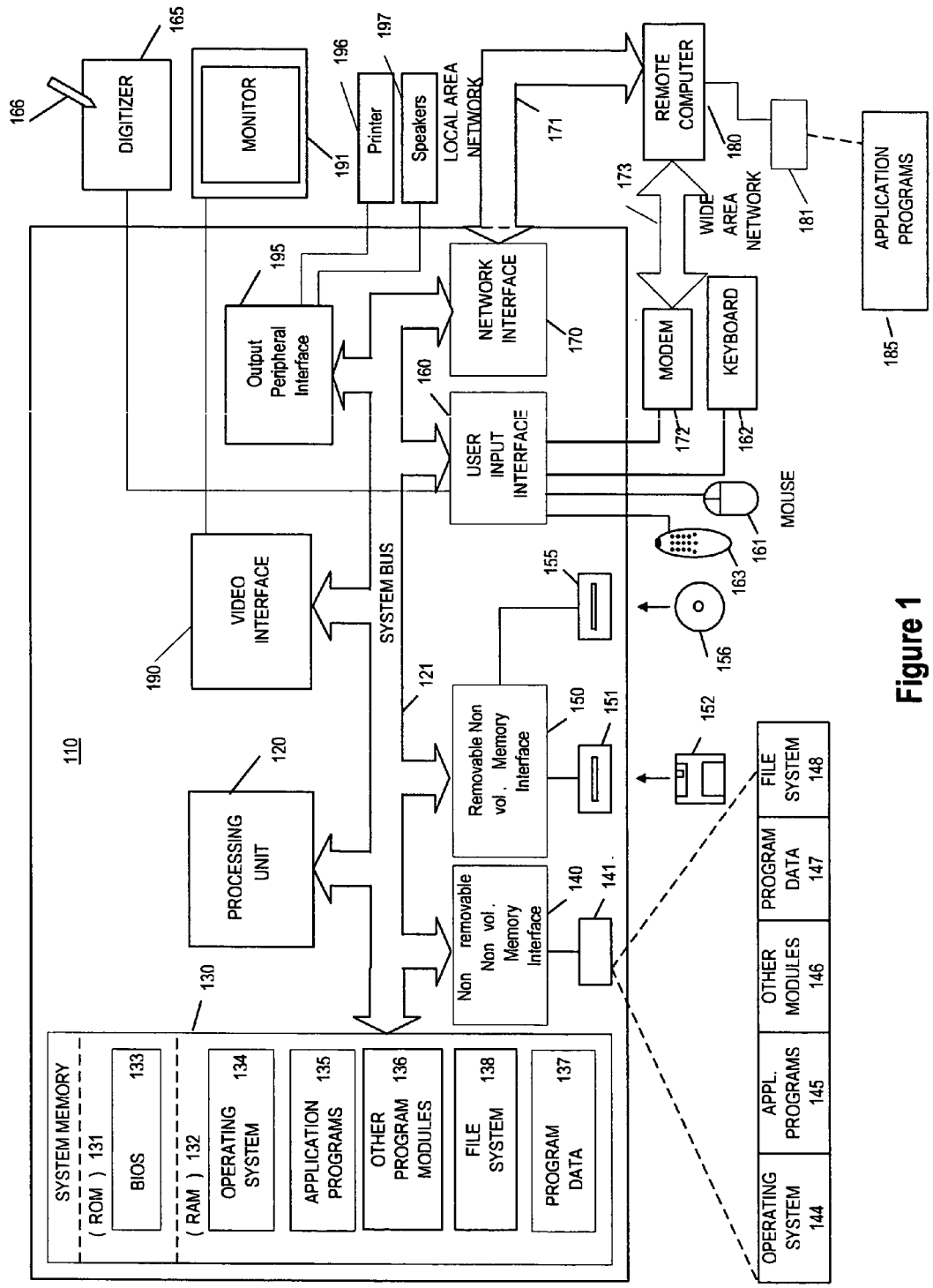
FIG. 1 illustrates a general operating environment suitable for implementation of a media user interface according to an illustrative embodiment of the invention.
Figure 2:
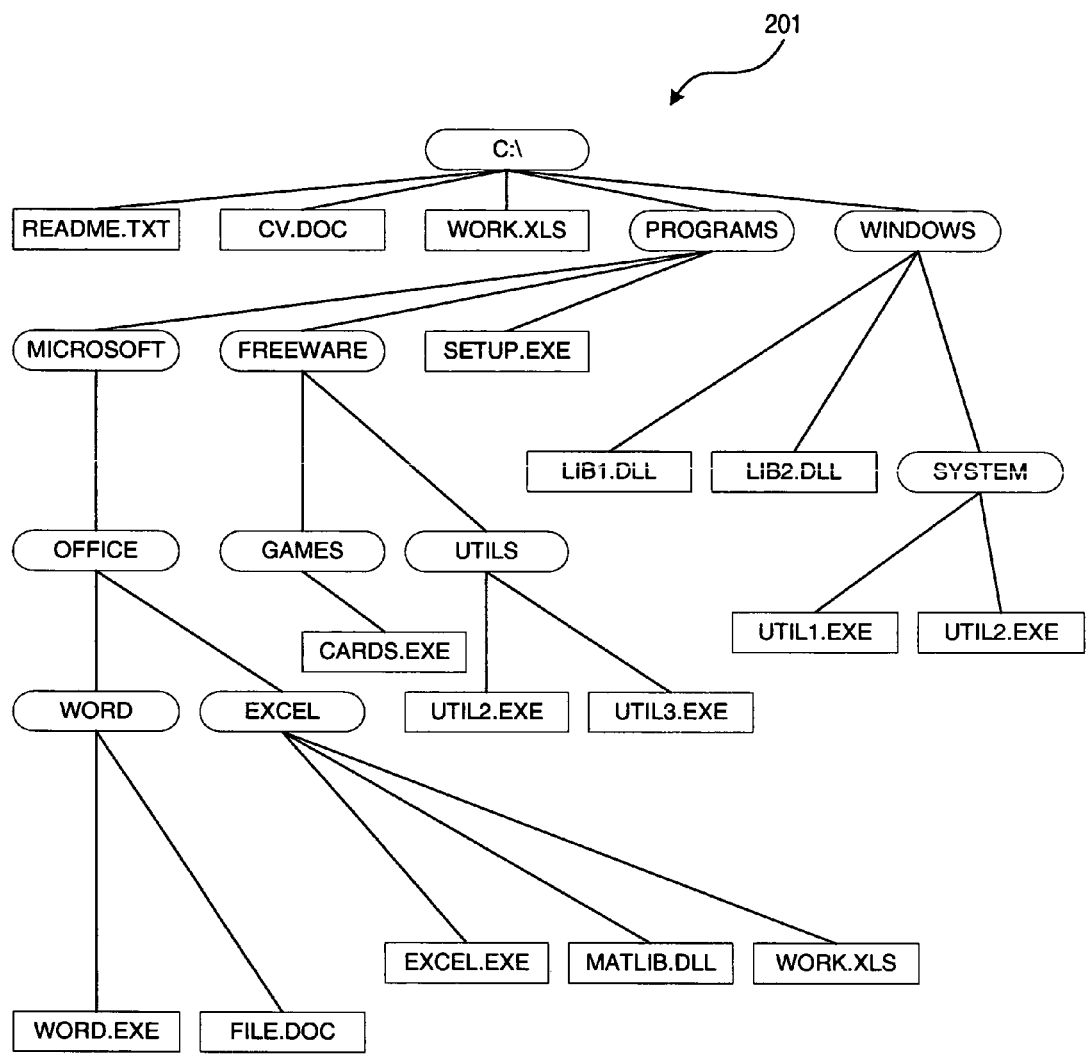
FIG. 2 illustrates a typical organizational structure of known file systems.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the illustrative operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 110 typically includes a variety of computer readable media. Computer readable media may be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium or combination of media that can be used to store information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, program data 137, and file system 138.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, program data 147, and file system 148. Note that these components can either be the same as or different from operating system 134, application programs 135, other program modules 136, program data 137, and file system 138. Operating system 144, application programs 145, other program modules 146, program data 147, and file system 148 are given different numbers in FIG. 1 to illustrate that, e.g., they are different copies. A user may enter commands and information into the computer 20 through input devices such as a keyboard 162 and pointing device 161, commonly referred to as a mouse, trackball or touch pad. Other input devices may include a remote control 163, microphone, joystick, game pad, satellite dish, scanner, or the like (not all shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device (e.g., a TV) is also connected to the system bus 121 via an interface, such as a video interface 190. In addition to the monitor, computers may also include other peripheral output devices such as speakers 197 and printer 196, which may be connected through an output peripheral interface 190.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. Further, the system may include wired and/or wireless capabilities. For example, network interface 170 may include Bluetooth, SWLan, and/or IEEE 802.11 class of combination abilities. It is appreciated that other wireless communication protocols may be used in conjunction with these protocols or in place of these protocols.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are illustrative and other means of establishing a communications link between the computers may be used.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

One or more aspects of the invention may be embodied in computer-executable instructions, such as in one or more program modules, executed by one or more computers or other devices such as computer 110. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments of the Invention

According to an illustrative aspect of the invention, a file system is described herein that does not conflate item lifetime with the item's placement within the file system's organizational structure, thus allowing an item to participate in multiple organizations or none at all, such as through both property based queries and through lists, which form one or more Directed Acyclic Graphs (DAG). A DAG is an organization where an item may have multiple parents. In a DAG, an item may not parent one of its ancestors, which would form a cycle.

The file system described herein may be embodied as computer executable instructions stored on a computer readable medium, for example, as file system 138 and/or file system 148 (FIG. 1). In addition, other computer readable media or memory in FIG. 1 may also include a file system the same as or different from the presently described file system. For example, media 152 and 156 may also include a file system. For purposes of explanation, the file system will be described herein with reference to file system 148.

With reference to FIG. 3 and FIG. 4, file system 148 primarily relies on two tables, location table (LOC) 301 and organizational table (ORG) 401. Location table 301, also referred to as the LOC table, stores information regarding physical and/or logical storage locations of each item stored in the file system, including, for example, a file identifier (ID) 303, file name 305, storage volume 307, location 309, and file size 311. File ID 303 is the primary key or reference used to refer to each item, and is unique for each item stored in the file system 148. File ID may include a number, alphabet text, symbols, or any combination, so long as each file ID uniquely identifies a single item stored in file system 148.

File name 305 may include a short descriptive filename of the item provided by a user of the file system 148. File name 305 is preferably the user's primary conceptual reference to each file, and may be designated by the user in a descriptive format such that the file is easily recognizable to the user based on the file name. File name 305 may be of restricted length, e.g., 8.3 format, max length of 256 characters, or some other maximum. Preferably, there are no restrictions on whether file names may be duplicative of each other, or even whether a file name is required or has been assigned. That is, multiple files may each be named "README.TXT" or "Read this first," even within the same directory, folder, or list, so long as each file has a unique file ID 303. This is unlike previous file systems, which require that each file have a unique name within the context of its parent.

Volume 307, location 309, and size 311 may be used to retrieve an item from a physical or logical storage location. Volume 307 may refer to a physical or logical storage device, e.g., a physical or logical hard disk drive, optical storage, storage media card, solid-state storage device, and the like. Location 309 may refer to the actual starting location of the item on the identified physical or logical volume, and size 311 may refer to a quantitative measure of the amount of space in which the item is stored on the identified volume starting at the identified location. Additional or alternative information may be included in location table 301, so long as the included information is usable to retrieve each stored item from its respective identified storage location.

Figure 5:
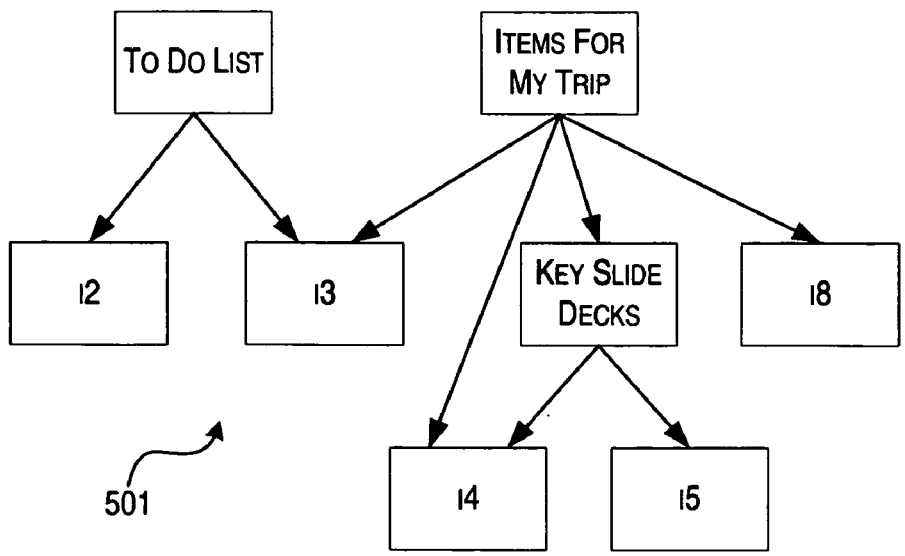
FIG. 5 illustrates a directed acyclic graph (DAG) organizational structure according to the organizational table depicted in FIG. 4.

Organizational table 401, also referred to as the ORG table, stores hierarchical relationships between items stored in file system 148. As discussed briefly above, the ORG table 401 may define one or more directed acyclic graphs (DAGs), which can include one or more trees, for conceptually arranging items in the file system 148. ORG table 401 may include, for each relationship, a parent 403 and a child 405. FIG. 5 illustrates an example of a DAG 501 as defined by portions of LOC table 301 and as defined by ORG table 401. DAG 501 is not a tree because item 12 is parented by (also referred to as being "in") both "To Do List" and "Items For My Trip," and item 14 is parented by both "Items For My Trip" and "Key Slide Decks." Each item stored in file system 148 may have no parent, one parent, or two or more parents, so long as the organization structure remains a DAG.

Figure 6:
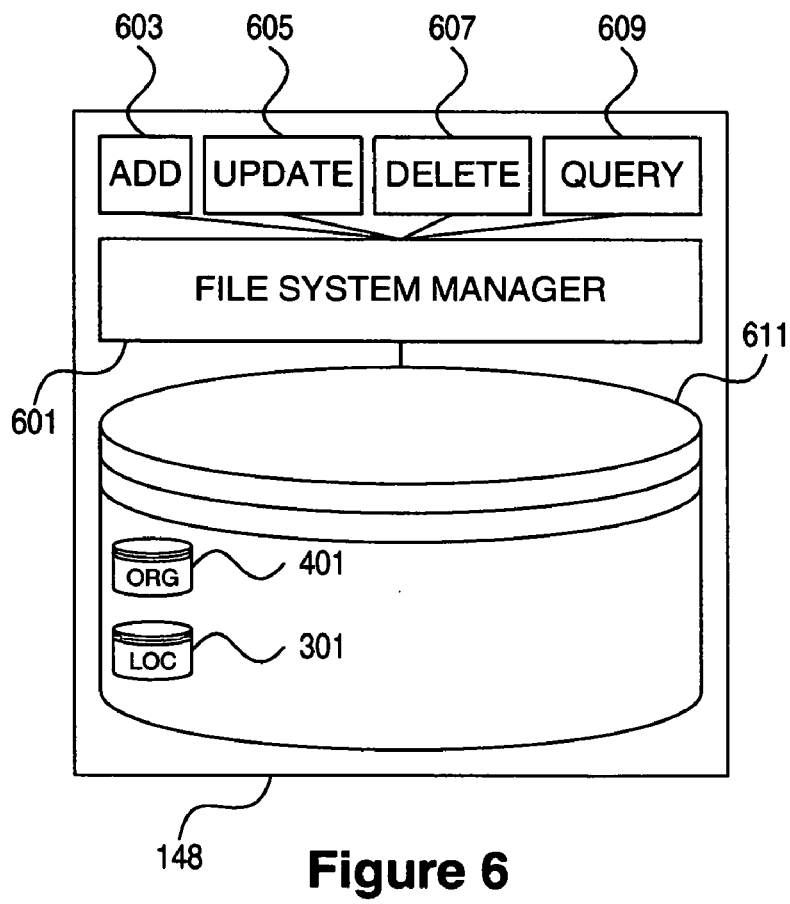
FIG. 6 illustrates a block diagram of a file system according to an illustrative embodiment of the invention.

FIG. 6 illustrates a block diagram of software modules that may be used in file system 148. File system 148 may have a file system manager software module 601 that manages overall operation of the file system 148. Manager 601 may add, update, delete, and read/query items stored in data store 611, using LOC table 301 and ORG table 401 as described herein, while enforcing rules regarding any restrictions placed on DAGs (e.g., no cycles allowed). Manager 601 may expose one or more application programming interfaces (APIs) through which higher level programs, such as an operating system, may interact with the file system 148. APIs may include an Add_Item API 603, an Update_Item API 605, a Delete_Item API 607, and a Query_Item API 609.

Add_Item API 603 may be called by the operating system or other higher level program or application when a new item is to be stored in the file system 148. Add_Item API 603 may accept as input a pointer to the new item's current temporary storage location, along with a file name, and optionally with an intended storage volume and/or parent ID. Add_Item API may optionally return a file ID for the newly added item.

Update_Item API 605 may be called to update an existing item already stored in file system 148, and may accept as input a File ID and one or more optionally included pieces of information selected from a pointer to the updated version of the item, an updated relationship for inclusion in ORG table 401, and/or an updated file name.

Delete_Item API 607 may be called to remove an item from file system 148, by passing to the Delete_Item API a file ID to delete. Only when Delete_Item API 607 is explicitly called is an item deleted from file system 148.

Query_Item API 609 may be called when an item needs to be retrieved from the file system for use by the OS or an application. Query_Item accepts as input a file ID, and returns the requested item. The above listed APIs are representative of the type of APIs that are preferably included in an illustrative embodiment of the invention. File system 148 may include additional or alternative APIs based on system needs or design.

Because file system 148 allows each item to have zero or more parents, there may be multiple independent data structures (i.e., multiple DAGs) within a single volume or file system. This is unlike known file systems, which typically limit a client (user or application) to storing items in a single tree per volume. Thus, the conceptual space in which items are stored in a file system as described here is referred to as a File Region (FR). A file region refers to a high-level user concept of an organizational area to used to control lifetime of an item. As long as an item remains within the file region, the item will not be deleted, regardless of whether the item is subject to any parent-child relationships defined in ORG table 401.

A file region can be conceptually thought of as a box into which items may be placed, irrespective of whether the items are conceptually related. If an item is placed in a file region, the item remains in the file region until the user deletes the item. While the item is in the file region, the item can be organized in any of one or more DAGs within the file region without having an impact on whether the item is within the file region and without an impact on the item's lifetime. That is, the file is not deleted until the user affirmatively instructs the file system to delete the file. The file region may encompass any arbitrarily defined storage area, regardless of whether all the included data stores are physically proximate to each other within the same computer, network, etc., so long as the data stores are managed as a single file region to ensure item lifetime. For example, a file region might encompass all internal hard drives on a computer, a portion of a single hard drive on a computer, networked storage alone or in combination with local storage, or any other defined storage space.

Figures 7, 8:
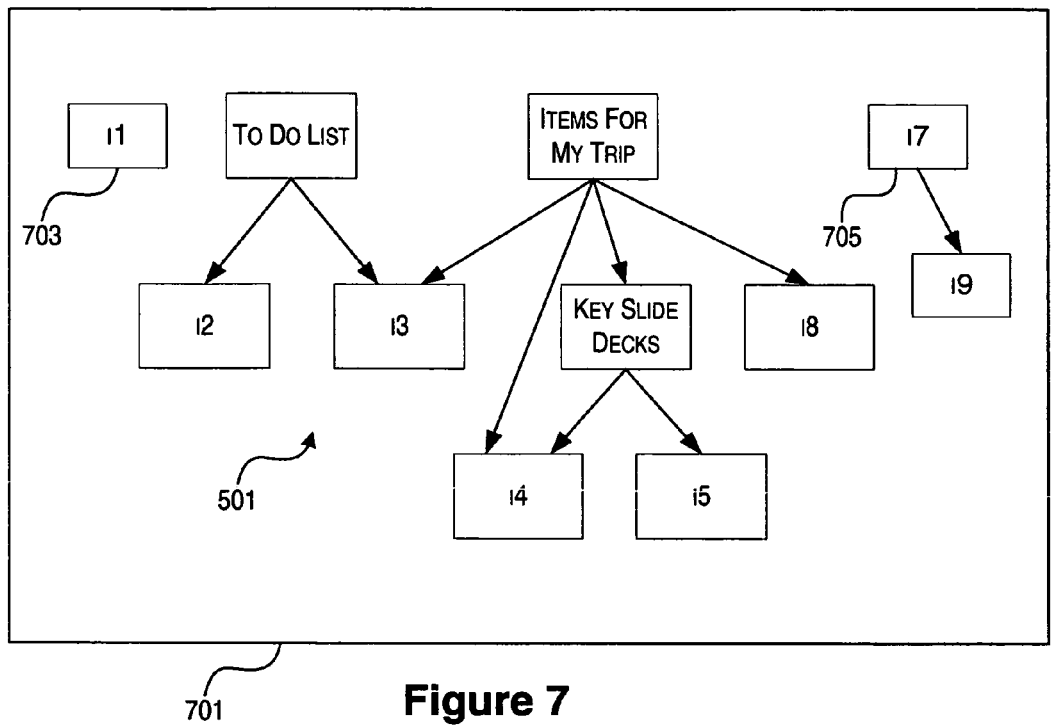
FIG. 7 illustrates a file region according to an illustrative embodiment of the invention.
FIG. 8 illustrates an organizational table defining the organizational structure of FIG. 7.

FIGS. 7 and 8 illustrate a file region 701 having three independent DAGs 501, 703, and 705. The only mandated relationship between DAGs 501, 703, and 705 is that they are located within the same file region, there is no required conceptual relationship between them. FIG. 8 illustrates an ORG table 801 that describes the DAGs shown in FIG. 7. FIG. 7 illustrates a conceptual view of file region 701, whereas FIG. 8 illustrates holding links used in file region 701. The file region 701 may be opened by a user, at which point the file system 148 may present the user with all of the "top-level," or "floating," items in the file region defined by the file system. As used herein, an item is defined as "top-level" or "floating" if it is not targeted by any holding links from other items in the ORG table corresponding to the file region. Thus, in FIG. 7, items i1, i7, To Do List, and Items For My Trip are considered to be top-level items, or floating items. To an end-user, list i7 is a form of organizational data structure. Based on the concept of multiple parents, an item can be in multiple lists, e.g., item i3. A list is an item that holds other items, ordered or unordered, and lists may replace the folders/directories that users are accustomed to working with in previous file systems. Lists can also be in or hold other lists.

Figures 9, 10, 11:
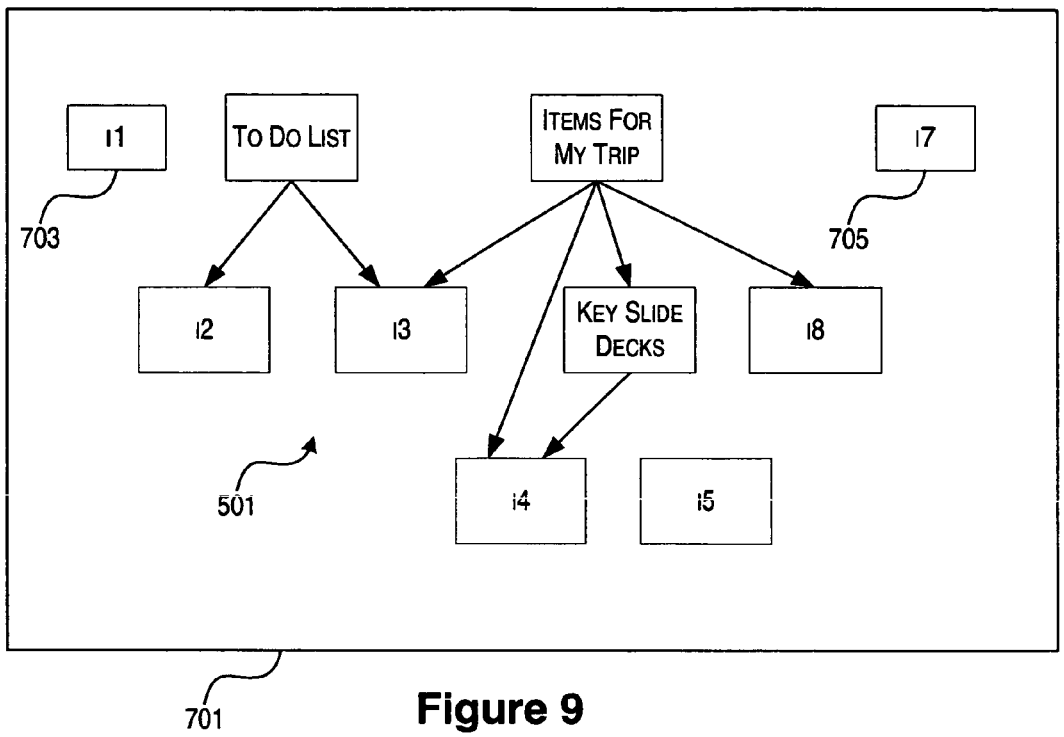
FIG. 9 illustrates a file region according to an illustrative embodiment of the invention.
FIG. 10 illustrates an organizational table defining the organizational structure of FIG. 9.
FIG. 11 illustrates an organizational table according to an illustrative embodiment of the invention.

File system 148 distinguishes between when a user or application (collectively referred to as clients) desires to remove an item from its underlying organizational structure versus when a client desires to delete the item from the file system entirely. FIGS. 9 and 10 illustrate file region 801 after a user or application removes item i5 from the Key Slide Decks list. That is, manager 601 removes the holding link in ORG table 1001 identifying Key Slide Decks (file ID 000007) as a parent of item i5 (file ID 000006), based on a request via Update_Item API 605. Item i5 is no longer part of a multi-item organizational structure, because all holding links related to item i5 have been removed from ORG table 401. However, because item i5 remains in file region 801, item i5 is not deleted from file system 148 or LOC table 301. Stated another way, because the client did not request to delete item i5, but rather requested to remove item i5, item i5 is not deleted from data store 611 and LOC table 301. Only upon a client affirmatively selecting item i5 and requesting a delete operation via Delete_Item API 607 will manager 601 remove item i5 (file ID 000006) from data store 611 and LOC table 301.

Figure 12:
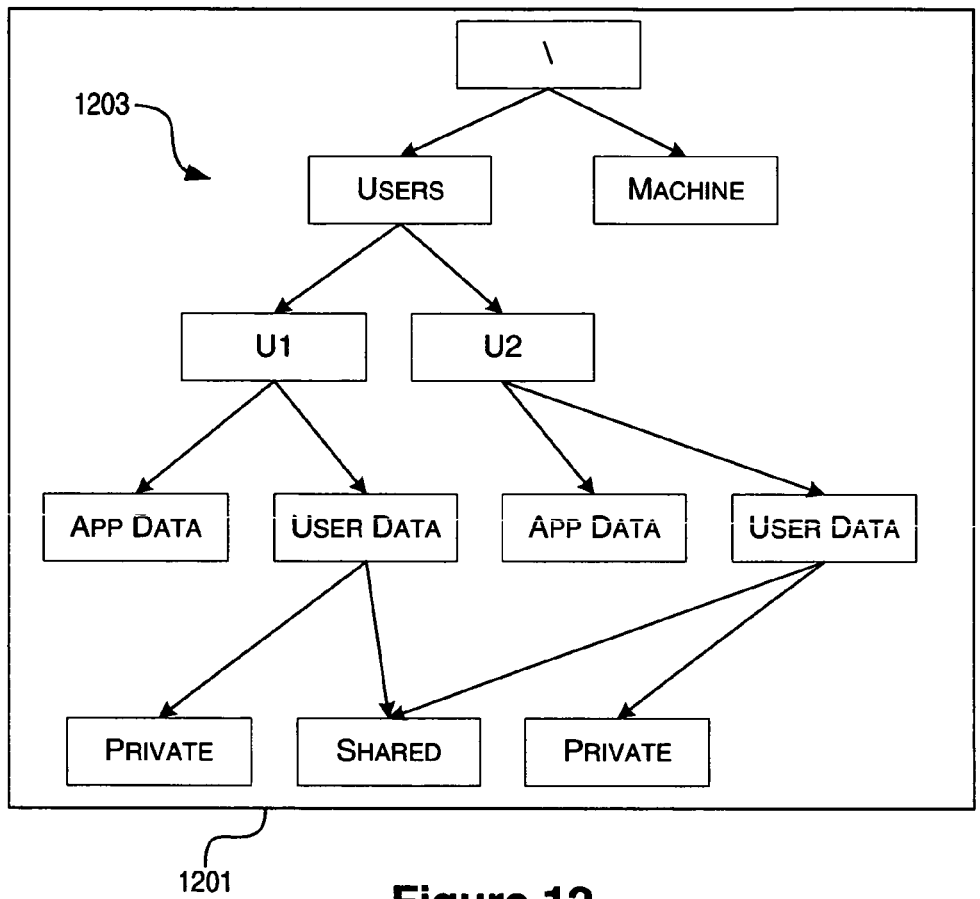
FIG. 12 illustrates a file region according to the organizational table depicted in FIG. 11.

With reference to FIGS. 11 and 12, file system 148 may be used to mimic organizational structures familiar to users, based on organizational structures used in previously known file systems, e.g., directory trees. With reference back to LOC table 301 (FIG. 3), items with file IDs 000301-000312 represent holding links for lists stored in file system 148. Each unordered list represents a directory in the directory tree 1203 conceptually represented in file region 1201 (FIG. 12) and ORG table 1101 (FIG. 11). The principal difference between directory tree 1203 and previously known directory trees is that the subdirectory "Shared" is accessible via either of the two "User Data" unordered lists, thus taking advantage of the multiple parent capability of the file system 148. In this manner, directories can easily be shared between users while still providing users an organizational structure with which they are familiar.

According to this illustrative embodiment of the invention, file system 148 provides a private workspace for each individual user of the computer system or network on which file system 148 is implemented, and also provides a common shared workspace available for all of the users of that computer system or network. The namespace is formed as it is with Private and Shared File Regions both under User Data. This allows a user's queries against the system to be rooted at the item domain formed by User Data, and thus will return both private and shared items in all typical queries. Using the namespace of FIG. 12, when interacting with items in the file system (acquiring new photos or music, creating documents, etc.) the user needs only to conceptually consider the question "Is this private or shared?" and place the item in the appropriate workspace. All users of the Shared workspace then have common visibility into the Shared workspace. Additionally, there may be a shared recycle bin per workspace so that if one user deletes an item that another user still wanted, the second user can retrieve it.

The scenarios for common shared workspaces are not limited to home users. On a corporate domain, a knowledge worker may set up a shared workspace for colleagues to collaborate on a project. The flexibility of the workspace will provide each user of the workspace the ability to organize the items, to query for items within the workspace, and provides common overall visibility of these items.

Figure 13:
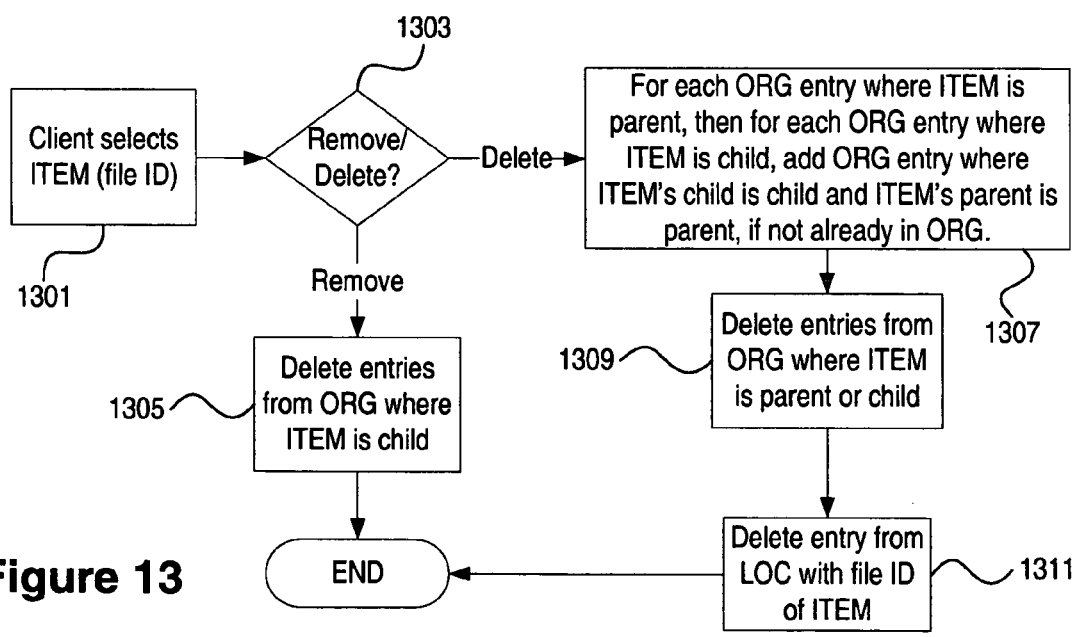
FIG. 13 illustrates a method for managing items stored in a file system according to an illustrative embodiment of the invention.

FIG. 13 illustrates a method for removing an item from its underlying organizational structure and/or deleting an item from file system 148. Initially, in step 1301, a client selects an item with specific file ID. Next, in step 1303, the client indicates either that the client wants to delete the item from file system 148 entirely, or that the client wants to simply remove the item from its underlying organizational structure. If the client selects "remove" in step 1303, then in step 1305 the file system manager deletes any entry from the ORG table where the item's file ID is present in the child column, and then the method ends.

If the client selects "delete" in step 1303, then in step 1307 the file system manager 601, for each ORG table entry where the item's file ID is present in the parent column, adds an entry in the ORG table where the child is child and ITEM's parent(s) is parent, if not already in the ORG table. Pseudocode that may be used is as follows:

For each ORG table entry X where $X_{parent}$=file_ID(ITEM)
    For each ORG table entry Y where $Y_{child}$=file_ID(ITEM)
        If ORG table does not have entry ($Y_{parent}$, $X_{child}$)
            Then Add ORG table entry ($Y_{parent}$, $X_{child}$)

After updating the ORG table accordingly, the file system manager in step 1309 deletes any entry from the ORG table that references the item's file ID as either parent or child. Finally, in step 1311, file system manager 601 deletes the entry from the LOC table that indicates where the item is stored. File system manager 601 may further perform a safe erase operation and overwrite the data stored at item's location with garbage data such that an undelete operation cannot be performed.

Alternatively, the file system manager may skip step 1307 and simply remove any entries from the ORG table in step 1309 where the item is either the parent or the child. A side effect of this alternative is that each child of the deleted item becomes removed from the organizational structure of the file system 148, unless a child is parented by a second item that remains in the organizational structure of the file system 148.

The above method is illustrated such that the selected item and any items pointed to by the item are removed from the underlying organizational structure. However, those of skill in the art will appreciate that alternative methods may be used where, when an item is removed from the organizational structure, that item's children are not also removed from the organizational structure. How the removal method is performed is secondary to the fact that removal and deletion are two distinct processes: the delete process deletes an item from storage altogether, whereas the removal process removes an item from the underlying organizational structure without affecting the item's lifetime (i.e., does not delete the item from storage or from the file system).

Traditional file system navigation tools, e.g., Windows EXPLORER brand system navigation tool by Microsoft Corporation of Redmond, Wash., typically only show files in the file system's organizational structure. Thus, if a client removes an item from the organizational structure of file system 148, i.e., the item is not present in the ORG table, then that item would not appear in the file system navigation display. Using aspects of the present invention, however, the client may query the file system manager 601 for all floating or top-level items (i.e., un-parented items) in order to find any items not presently within the organization structure.

File system 148 may provide additional features, such as query domains and security, based on the organizational structure defined by ORG table 401. That is, in addition to defining organizational structures, holding links in the ORG table may also be used to form queryable item domains, or also referred to as namespaces. A client can query any item involved in at least one holding link for which that item is the parent. For example, with reference to FIG. 7, a query on "Items For My Trip" returns items i3, i4, i5, and i8, as well as Key Slide Decks. Duplicative items are preferably returned only once. For example, i4, also parented by Key Slide Decks, is preferably returned only once.

The organizational structure of file system 148 may also be used to propagate a namespace for use by legacy applications, and also to provide new users with a conceptually recognizable user interface to interact with file system 148. For example, with reference to FIG. 12, the item "User Data" under "U1" can be referred to by clients as \Users\U1\User Data, thus providing end-users and legacy applications with a conceptually familiar interface.

The organizational structures defined by ORG 401 may also be used to propagate security information in file system 148. That is, a security table (not shown) might provide security information for an item. By default, if a user has access to a given item, the user by default also has access to all other items pointed to by the given item, whether directly or indirectly.

For example, security for item U1 (FIG. 12) might indicate that only the user with username=Ross can access the files in U1. Unless differing security information is provided for items App Data and User Data parented by U1, then only Ross can view those items as well. The same would hold true for Private (parented by User Data parented by U1), and Shared. Security for item U2 might indicate that only the user with username=Jordan can access the files in U2. Unless differing security information is provided for items App Data and User Data parented by U2, then only Jordan can view those items as well. The same would hold true for Private (parented by User Data parented by U2), and Shared. While it appears that the item Shared has conflicting security information, security information is preferably additive. Thus, item Shared will receive security information from both U1 and U2 to permit "only Ross and Jordan." Alternatively, suppose item U1 had permissions equivalent to "only Ross, not Tom." Item Shared would then receive security permissions equivalent to "only Ross and Jordan, and not Tom."

When an item is removed from ORG, security stops propagating to the removed item. For example, if item i5 is removed from "Key Slide Decks" as illustrated in FIG. 9, then the user no longer will have access to i5 unless the user is given permission to access i5. File system 148 might specify, however, that by default a client can access all items unless the client is specifically prohibited from accessing an item.

Because lists also form a namespace as described above, if a user from a Windows XP or other legacy machine (which might not be equipped to work with file regions, DAGs or lists as described herein) connects to file system 148, that user may see the lists visible as folders that can be navigated. Similarly, when a user double-clicks on a given item within the context of a list (on either a legacy operating system or on a system enabled with file system 148), the file system provides to the requesting application the namespace formed by the current list. This provides the application with necessary context. For example, if the user attempts to open item i2 through the list "To do List," the file system returns to the application the path that is formed through the "To do list," i.e., \To Do List\i2. Thus, if the user chooses to use the command "File|Save As . . . " within the application (to create a new copy of the item, for instance), the application will have the correct context to present to the user.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A file system embodied as data items and computer executable instructions stored on a computer storage readable medium for processing by a computer, comprising:

a file manager for managing the operations of storing information related to data items including adding, updating, deleting and querying data items in a first data table and second data table, where the data items are stored in a specified conceptual file region within the file system;

said first data table storing item location information for a plurality of data items, where the data items are identified, within the file system, by a unique ID separate from a file name; and said second data table storing organizational structure information for only said data items stored in the first data table of said file system that have at least one relationship with another data item, the organizational information including a holding link between data items in a hierarchical relationship, wherein management of the delete operation by the file manager deletes a first specified data item from the file system regardless of whether the first specified data item is targeted by any holding links from other items stored in said second data table corresponding to the specified conceptual file region, and upon deleting the first specified data item from the file system, the file manager, for each entry in the second data table where the first specified data item is listed as a parent, adds an entry in the second data table listing the parent of the first specified data item as the parent and a child of the first specified data item as the child, management of the removal operation by the file manager removes a second specified data item from an organizational structure of the file system without deleting the second specified data item from the file system, and management of the query operation by the file manager queries the data items that are not targeted by any holding links from other items stored in said second data table corresponding to the specified conceptual file region to locate the removed second specified data item.

2. The file system of claim 1, wherein said first table and said second table comprise separate tables.

3. The file system of claim 1, wherein said first table stores, for each data item, an item name, and a storage location of the data item.

4. The file system of claim 1, wherein each entry of said second table defines a relationship between two stored data items.

5. The file system of claim 4, wherein said relationship comprises a parent-child relationship.

6. The file system of claim 5, wherein all entries of the second data table can be collectively represented as a directed acyclic graph.

7. The file system of claim 4, wherein said second table stores a first entry identifying the first data item as a parent of the second data item.

8. The file system of claim 7, wherein the second item inherits security permissions from the first item based on the relationship between the first and second data items.

9. A file system for storing data items, said file system embodied as computer executable instructions stored on a computer readable medium, for processing by a computer, said file system comprising:

a file manager for managing the operations of storing information related to data items including adding, updating, deleting and querying data items in a first data table and a second data table, where the data items are stored in a specified conceptual file region within the file system;

said first data table storing item location information for a plurality of data items, where the data items are identified, within the file system, by a unique ID separate from a file name; and said second data table storing organizational structure information for only said data items stored in the first data table of said file system that have at least one relationship with another data item, the organizational information including a holding link between data items in a hierarchical relationship, wherein the lifetime of each data item is independent of an organization of each data item relative to other data items stored in the file system, wherein management of the delete operation by the file manager deletes a first specified data item from the file system regardless of whether the first specified data item is targeted by any holding links from other items stored in said second data table corresponding to the specified conceptual file region, and upon deleting the first specified data item from the file system, the file manager, for each entry in the second data table where the first specified data item is listed as a parent, adds an entry in the second data table listing the parent of the first specified data item as the parent and a child of the first specified data item as the child, management of the removal operation by the file manager removes a second specified data item from an organizational structure of the file system without deleting the second specified data item from the file system, and management of the query operation by the file manager queries the data items that are not targeted by any holding links from other items stored in said second data table corresponding to the specified conceptual file region to locate the removed second specified data item.

10. The file system according to claim 9, wherein the file system determines the lifetime of each data item independent of a relationship of that data item to other data items stored in the file system.

11. The file system according to claim 5, wherein the file system stores a first data item having no parent-child relationship to other data items stored in the file system.

12. The file system of claim 1, wherein each data item can link to another data item in said hierarchical relationship where the same data item can be linked within multiple separate hierarchical relationships.

13. The file system of claim 1, wherein deletion of a data item for the hierarchical relationship deletes only the link of the data item to the hierarchical relationship.

* * * * *